(12) United States Patent
Lin

(10) Patent No.: US 9,195,360 B2
(45) Date of Patent: Nov. 24, 2015

(54) POSITION DETECTING METHOD AND SYSTEM

(71) Applicant: SUNREX TECHNOLOGY CORP., Taichung (TW)

(72) Inventor: Shun-Pin Lin, New Taipei (TW)

(73) Assignee: Sunrex Technology Corp., Taichung (TW)

( * ) Notice: Subject to any disclaimer, the term of this patent is extended or adjusted under 35 U.S.C. 154(b) by 238 days.

(21) Appl. No.: 13/942,398

(22) Filed: Jul. 15, 2013

(65) Prior Publication Data

US 2015/0015527 A1 Jan. 15, 2015

(51) Int. Cl.
*G06F 3/046* (2006.01)
(52) U.S. Cl.
CPC ..................................... *G06F 3/046* (2013.01)
(58) Field of Classification Search
None
See application file for complete search history.

(56) References Cited

U.S. PATENT DOCUMENTS

| 2003/0217871 A1* | 11/2003 | Chao et al. | 178/18.01 |
| 2005/0174259 A1* | 8/2005 | Ely | 341/5 |
| 2007/0085836 A1* | 4/2007 | Ely | 345/173 |

\* cited by examiner

*Primary Examiner* — Kent Chang
*Assistant Examiner* — Benjamin Morales Fernande
(74) *Attorney, Agent, or Firm* — Christie, Parker & Hale, LLP

(57) ABSTRACT

A position detecting method includes: transmitting to a position indicator a first excitation signal that has a variable frequency and then receiving a first response signal therefrom, via a target antenna unit including a target antenna; determining, based on the first response signal, a target frequency of the first excitation signal at which the first response signal has a maximum energy level; continuously transmitting to the position indicator a second excitation signal that has the target frequency and then receiving a second response signal from the position indicator, via a group of antenna units including the target antenna unit individually and successively; and obtaining position information corresponding to the position indicator based on the second response signal.

4 Claims, 6 Drawing Sheets

POSITION DETECTING METHOD AND SYSTEM

BACKGROUND OF THE INVENTION

1. Field of the Invention

This invention relates to position detection, and more particularly to a position detecting method and a position detecting system.

2. Description of the Related Art

Referring to FIGS. 1 and 2, a conventional passive-type digital tablet pointing system disclosed in U.S. Pat. No. 7,176,907 is shown to include a digital tablet 1 and a wireless pointing device 2 (e.g., a digital stylus).

The wireless pointing device 2 is operable to obtain energy from an external signal upon receipt of the external signal, and then to transmit, in response to the external signal, a signal having an oscillation frequency using the energy obtained thereby. The wireless pointing device 2 includes a variable inductor 21, two capacitors 22, 23, and a switch 24. Inductance of the variable inductor 21 decreases with increasing contact pressure between the wireless pointing device 2 and the digital tablet 1 to thereby increase the oscillation frequency. When the switch 24 conducts, the capacitor 23 causes the oscillation frequency to decrease.

The digital tablet 1 includes a plurality of first antennas 11 arranged in a first direction, and a plurality of second antennas 12 arranged in a second direction perpendicular to the first direction. The digital tablet 1 is operable, via all or a group of the first and second antennas 11, 12 successively, to continuously transmit to the wireless pointing device 2 an excitation signal having a constant frequency and then to receive a response signal, which is transmitted from the wireless pointing device 2 in response to the excitation signal, so as to perform full-region or sub-region scanning. The digital tablet 1 is further operable to obtain, based on an energy level of the response signal, position information corresponding to a position that is indicated by the wireless pointing device 2 and that is relative to the digital tablet 1, and to obtain, based on a frequency of the response signal, state information associated with the wireless pointing device 2 (e.g., the contact pressure between the wireless pointing device 2 and the digital tablet 1, and operation state of the switch 24).

However, the conventional digital tablet pointing system has the following drawbacks:

1. The position information and the contact pressure obtained by the digital tablet 1 have relatively low precision. The operation state of the switch 24 obtained by the digital tablet 1 may be inaccurate.

2. The digital tablet 1 uses a relatively large number of switches 13 for the first and second antennas 11, 12, respectively.

3. Moreover, a frequency/voltage conversion circuit 14 is required for the digital tablet 1 to generate the state information.

SUMMARY OF THE INVENTION

Therefore, the object of the present invention is to provide a position detecting method and a position detecting system that can overcome the aforesaid drawbacks associated with the prior art.

According to one aspect of this invention, there is provided a position detecting method for detecting, using a position detecting apparatus, a position indicated by a position indicator. The position detecting apparatus includes a plurality of antenna units, each of which includes at least one antenna. The antennas of the antenna units are arranged in a direction. The position indicator is operable to obtain energy from an external signal upon receipt of the external signal, and then, to transmit a signal in response to the external signal using the energy obtained thereby. The position detecting method comprises the steps of: (A) by the position detecting apparatus, transmitting to the position indicator a first excitation signal having a variable frequency, and then, receiving a first response signal transmitted from the position indicator in response to the first excitation signal, via a target one of the antenna units which includes an antenna serving as a target antenna; (B) determining based on the first response signal, by the position detecting apparatus, a target frequency of the first excitation signal at which the first response signal has a maximum energy level; (C) by the position detecting apparatus, continuously transmitting to the position indicator a second excitation signal having the target frequency, and then, receiving a second response signal, which is transmitted from the position indicator in response to the second excitation signal, via a group of the antenna units individually and successively, the group of the antenna units including the target one of the antenna units; and (D) obtaining based on the second response signal, by the position detecting apparatus, position information corresponding to the position that is indicated by the position indicator and that is relative to the position detecting apparatus.

According to another aspect of this invention, a position detecting system comprises a position indicator and a position detecting apparatus. The position indicator is operable to obtain energy from an external signal upon receipt of the external signal and then transmit a signal in response to the external signal using the energy obtained thereby. The position detecting apparatus includes a plurality of antenna units, a transmitting unit, a receiving unit, a switching unit and a processing unit. Each of the antenna units has at least one antenna. The antennas of the antenna units are arranged in a direction. The transmitting unit is operable to generate, based on a transmission control signal, an excitation signal having a frequency associated with the transmission control signal. The switching unit is coupled to the antenna units, the transmitting unit and the receiving unit, and is operable to connect, based on a switching control signal, one of the antenna units to the transmitting and receiving units, such that the transmitting unit transmits the excitation signal to the position indicator via said one of the antenna units, and the receiving unit then receives a response signal transmitted from the position indicator in response to the excitation signal from the transmitting unit via said one of the antenna units. The receiving unit is operable to detect an energy level of the response signal received thereby so as to generate a detection signal. The processing unit is coupled to the transmitting unit, the receiving unit and the switching unit, and receives the detection signal from the receiving unit. The processing unit is operable to generate the transmission control signal and the switching control signal, and outputs the transmission control signal and the switching control signal to the transmitting unit and the switching unit, respectively. The processing unit is further operable to obtain, based on the detection signal, position information corresponding to a position that is indicated by the position indicator and that is relative to the position detecting apparatus.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 3:
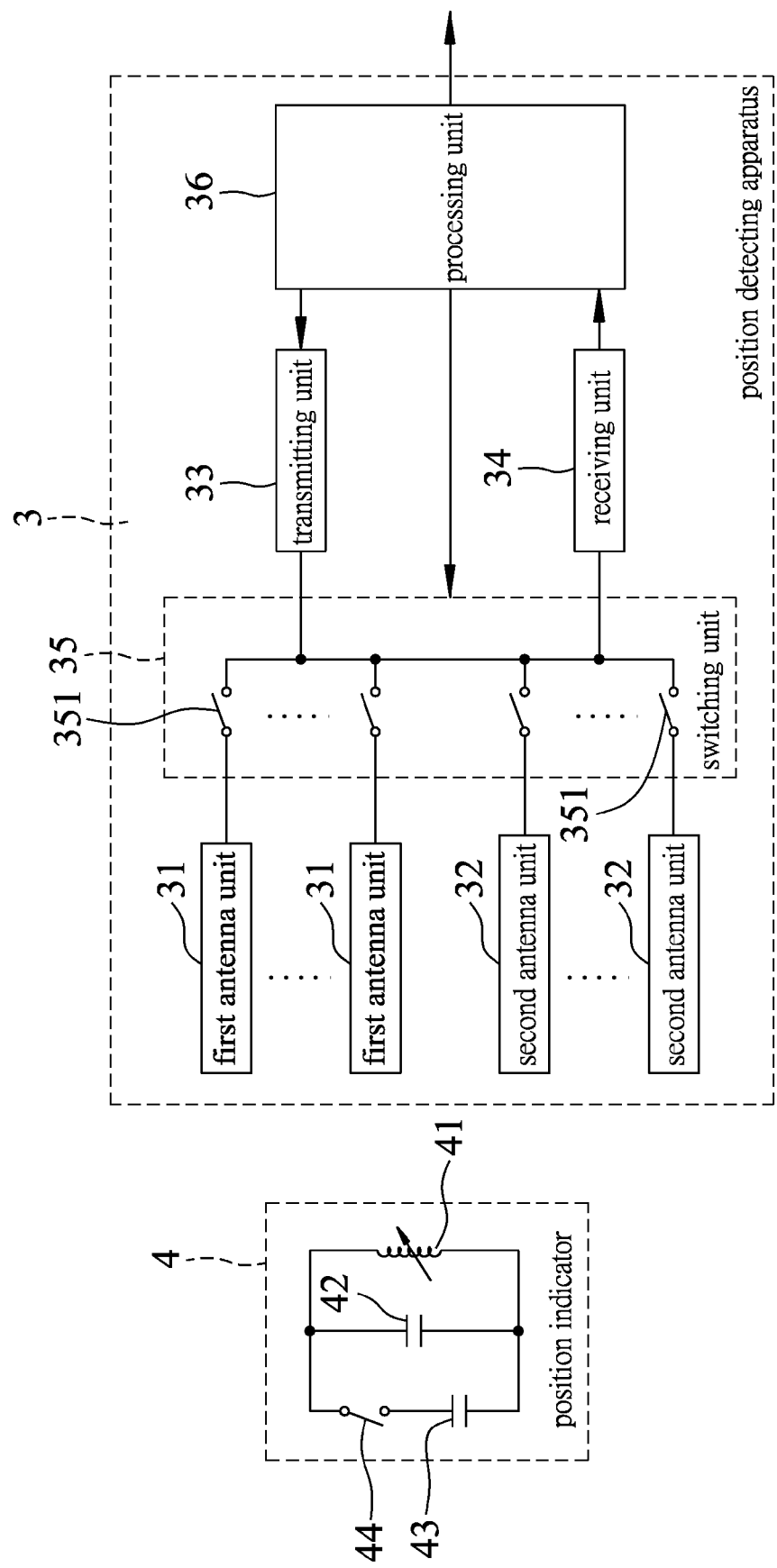
FIG. 3 is a schematic circuit block diagram illustrating the preferred embodiment of a position detecting system according to this invention.

Referring to FIG. 3, the preferred embodiment of a position detecting system according to this invention includes a position detecting apparatus 3 (e.g., a digital tablet) and a position indicator 4 (e.g., a digital stylus).

The position indicator 4 is operable to obtain energy from an external signal upon receipt of the external signal, and then, to transmit a signal having an oscillation frequency in response to the external signal using the energy obtained thereby. In this embodiment, the position indicator 4 includes a variable inductor 41, two capacitors 42, 43, and a switch 44. Inductance of the variable inductor 41 decreases with increasing contact pressure between the position indicator 4 and the position detecting apparatus 3 to thereby increase the oscillation frequency. When the switch 44 conducts, the capacitor 43 causes the oscillation frequency to decrease.

The position detecting apparatus 3 includes a plurality of first antenna units 31, a plurality of second antenna units 32, a transmitting unit 33, a receiving unit 34, a switching unit 35 and a processing unit 36.

Figure 4:
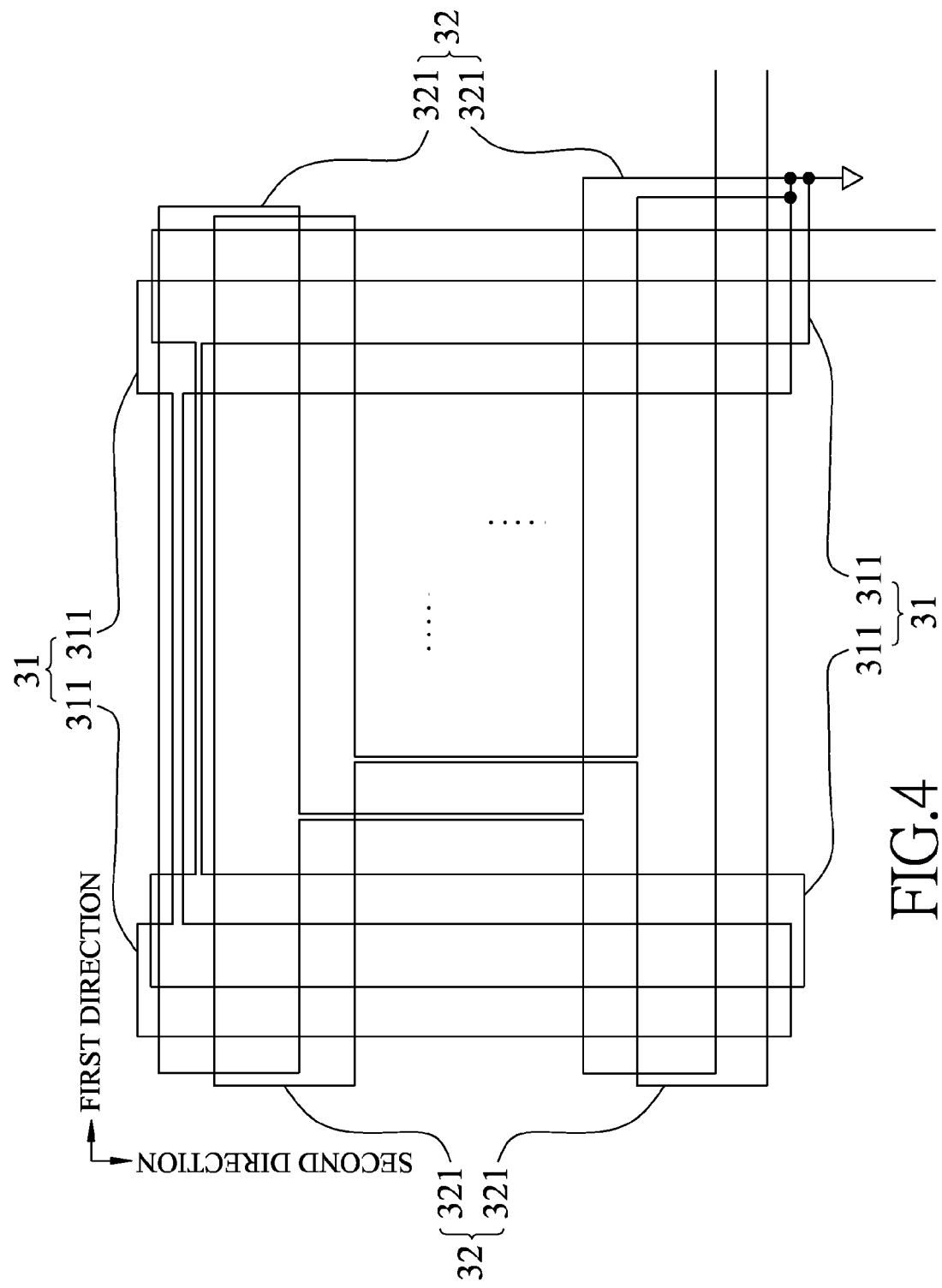
FIG. 4 is a schematic circuit diagram illustrating first antenna units and second antenna units of a position detecting apparatus of the position detecting system of the preferred embodiment.

Referring further to FIG. 4, in this embodiment, each of the first antenna units 31 has, but is not limited to, two antennas 311. The antennas 311 of the first antenna units 31 are arranged in a first direction, and are consecutively numbered in the first direction. In this embodiment, each of the second antenna units 32 has, but is not limited to, two antennas 321. The antennas 321 of the second antenna units 32 are arranged in a second direction perpendicular to the first direction, and are consecutively numbered in the second direction. The arrangement of the antennas 311, 321 is identical to that disclosed in Taiwanese Patent No. I351632. In other embodiments, each of the first and second antenna units 31, 32 can have a single antenna 311, 312 such that the arrangement of the antennas 311, 312 is identical to that disclosed in U.S. Pat. No. 7,176,907 (see FIG. 1).

The transmitting unit 33 is operable to generate, based on a transmission control signal, an excitation signal having a frequency and an energy level that are associated with the transmission control signal. The switching unit 35 is coupled to the first antenna units 31, the second antenna units 32, the transmitting unit 33 and the receiving unit 34, and is operable to connect, based on a switching control signal, one of the first and second antenna units 31, 32 to the transmitting and receiving units 33, 34. As a result, the transmitting unit 33 transmits the excitation signal to the position indicator 4 via said one of the first and second antenna units 31, 32, and the receiving unit 34 then receives a response signal transmitted from the position indicator 4 in response to the excitation signal from the transmitting unit 33 via said one of the first and second antenna units 31, 32. The receiving unit 34 is operable to detect an energy level of the response signal received thereby so as to generate a detection signal. In this embodiment, the switching unit 35 includes a plurality of switches 351. Each switch 351 has a first terminal coupled to a respective one of the first and second antenna units 31, 32, and a second terminal coupled to the transmitting and receiving units 33, 34. The switches 351 operate in response to the switching control signal.

The processing unit 36 is coupled to the transmitting unit 33, the receiving unit 34 and the switching unit 35, and receives the detection signal from the receiving unit 34. The processing unit 36 is operable to generate and output the transmission control signal and the switching control signal to the transmitting unit 33 and the switching unit 35, respectively. The processing unit 36 is further operable to obtain, based on the detection signal, position information corresponding to a position that is indicated by the position indicator 4 and is relative to the position detecting apparatus 3.

Figure 5:
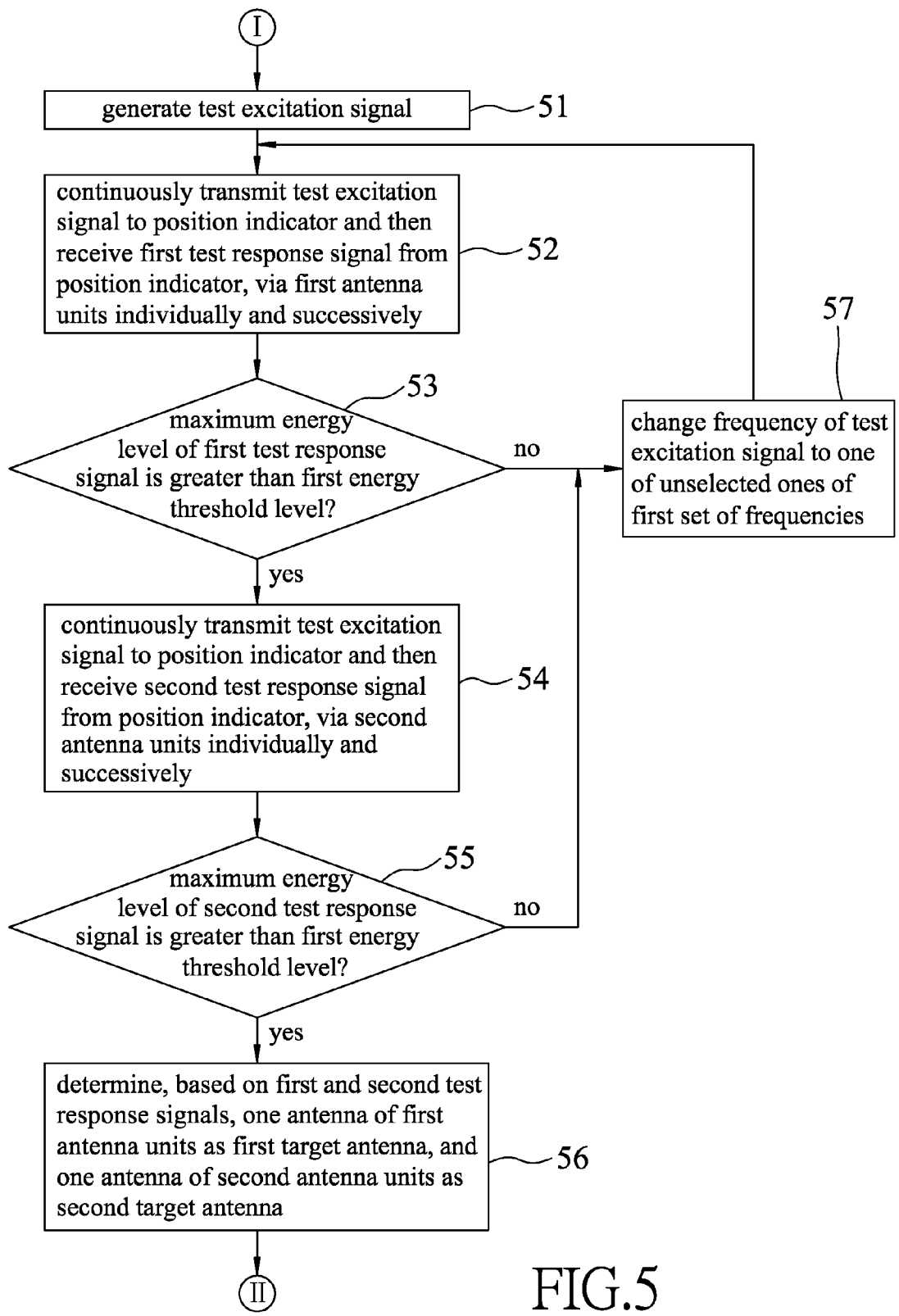
FIGS. 5 and 6 are flow charts illustrating a position detecting method performed by the position detecting system of the preferred embodiment.
Figure 6:
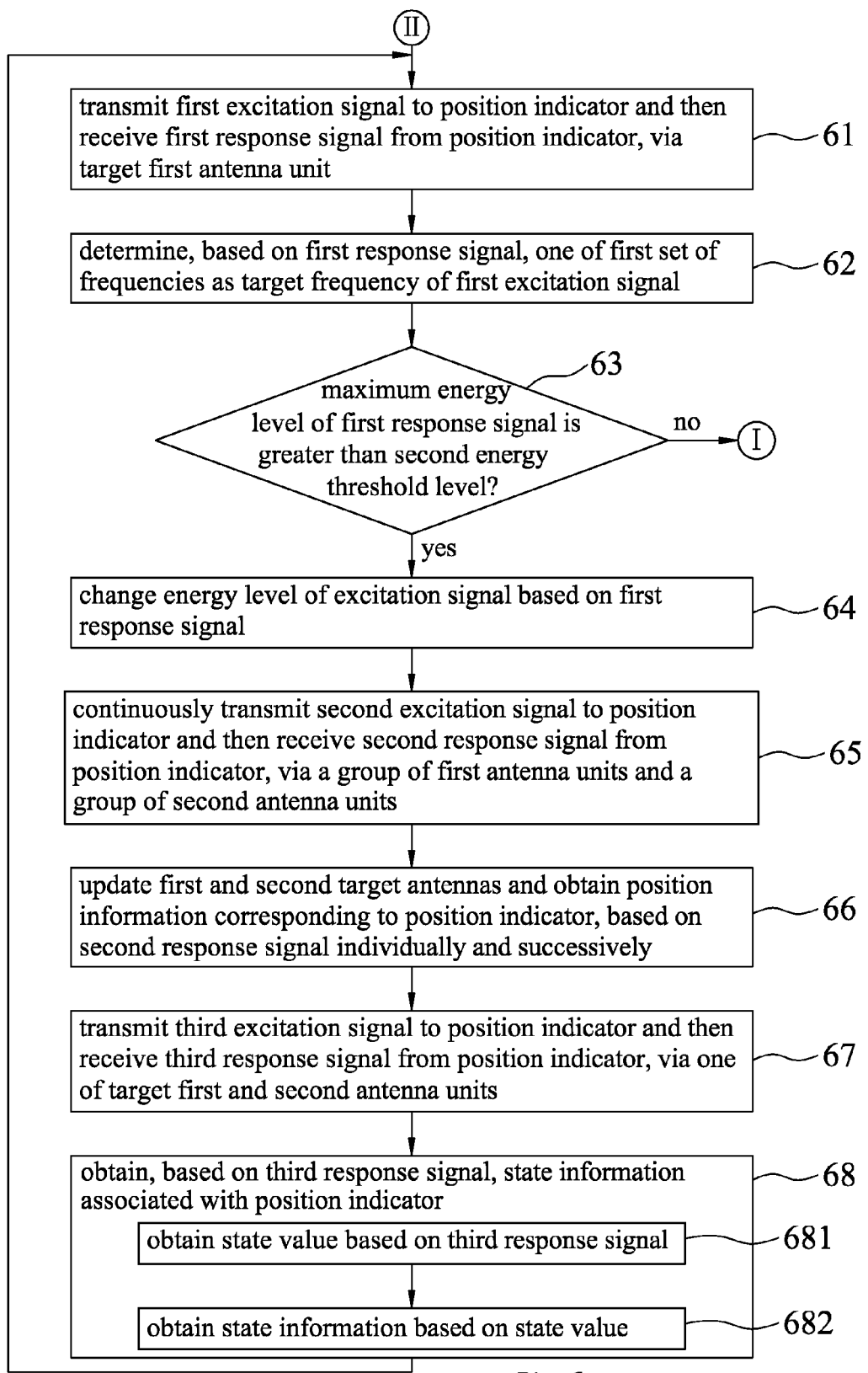

Referring further to FIGS. 5 and 6, a position detecting method performed by the position detecting system of the preferred embodiment is shown to include the following steps 51-57 and 61-68, wherein steps 51-57 are associated with full-region scanning, and steps 61-68 are associated with sub-region scanning.

In step 51, the transmitting unit 33 generates, in response to the transmission control signal from the processing unit 36, a test excitation signal serving as the excitation signal. The test excitation signal has a frequency selected from a first set of predetermined different frequencies, and a maximum energy level.

In step 52, the switching unit 35 operates, in response to the switching control signal from the processing unit 36, to individually and successively connect the first antenna units 31 to the transmitting and receiving units 33, 34. In this case, the transmitting unit 33 continuously transmits the test excitation signal to the position indicator 4 via the first antenna units 31, which are connected to the transmitting unit 33 individually and successively. In response to the test excitation signal, the position indicator 4 transmits a first test response signal serving as the response signal. Thus, the receiving unit 34 then receives the first test response signal via the first antenna units 31, which are connected to the receiving unit 34 individually and successively. Thereafter, the receiving unit 34 generates the detection signal based on the first test response signal and outputs the detection signal to the processing unit 36.

In step 53, the processing unit 36 determines, based on the detection signal generated in step 52, whether a maximum energy level of the first test response signal is greater than a predetermined first energy threshold level. If affirmative, the flow proceeds to step 54. Otherwise, the flow goes to step 57.

In step 54, the switching unit 35 operates, in response to the switch control signal from the processing unit 36, to individually and successively connect the second antenna units 32 to the transmitting and receiving units 33, 34. In this case, the transmitting unit 33 continuously transmits the test excitation signal to the position indicator 4, via the second antenna units 32, which are connected to the transmitting unit 33 individually and successively. In response to the test excitation signal, the position indicator 4 transmits a second test response signal serving as the response signal. Thus, the receiving unit 34 receives the second test response signal via the second antenna units 32, which are connected to the receiving unit 34 individually and successively. Thereafter, the receiving unit 34 generates another detection signal based on the second test response signal, and outputs the detection signal thus generated to the processing unit 36.

In step 55, the processing unit 36 determines, based on the detection signal generated in step 54, whether a maximum energy level of the second test response signal is greater than the first energy threshold level. If affirmative, the flow proceeds to step 56. Otherwise, the flow goes to step 57.

In step 56, the processing unit 36 determines, based on the detection signals generated in steps 52, 54 and corresponding to the first and second test response signals, respectively, one antenna 311 of the first antenna units 31 as a first target antenna that is closest to the position indicator 4, and one antenna 321 of the second antenna units 32 as a second target antenna that is closest to the position indicator 4. Then, the flow proceeds to step 61.

In step 57, the transmitting unit 33 changes, in response to the transmission control signal from the processing unit 36, the frequency of the test excitation signal to one of unselected ones of the first set of frequencies. Then, the flow goes back to step 52.

In step 61, the switching unit 35 operates, in response to the switching control signal from the processing unit 36, to connect a target one of the first antenna units 31, to which said one antenna 311 serving as the first target antenna belongs, to the transmitting and receiving units 33, 34. In this case, the transmitting unit 33 generates, in response to the transmission control signal from the processing unit 36, a first excitation signal serving as the excitation signal. The first excitation signal has a frequency that varies with time within the first set of frequencies. The first excitation signal is transmitted to the position indicator 4 via the target one of the first antenna units 31. Then, the receiving unit 34 receives a first response signal that serves as the response signal and that is transmitted from the position indicator 4 in response to the first excitation signal, via the target one of the first antenna units 31. Thereafter, the receiving unit 34 generates the detection signal based on the first response signal, and outputs the detection signal to the processing unit 36.

In step 62, the processing unit 36 selects, based on the detection signal that is generated in step 61 and that corresponds to the first response signal, one of the first set of frequencies as a target frequency of the first excitation signal at which the first response signal has a maximum energy level.

In step 63, the processing unit 36 determines, based on the detection signal generated in step 61, whether the maximum energy level of the first response signal is greater than a predetermined second energy threshold level. If affirmative, the flow proceeds to step 64. Otherwise, the flow goes back to step 51.

In step 64, the transmitting unit 33 changes, in response to the transmission control signal from the processing unit 36, the energy level of the excitation signal. When a difference between the maximum energy level of the first response signal and the second energy threshold level becomes large, the energy level of the excitation signal is lowered, and when the difference becomes small, the energy level of the excitation signal is raised.

In step 65, the transmitting unit 33 generates, in response to the transmission control signal from the processing unit 36, a second excitation signal serving as the excitation signal and having the target frequency. At the same time, the switching unit 35 operates, in response to the switching control signal from the processing unit 36, to individually and successively connect a group of the first antenna units 31 and a group of the second antenna units 32 to the transmitting and receiving units 33, 34. The group of the first antenna units 31 includes the target one of the first antenna units 31. The group of the second antenna units 32 includes a target one of the second antenna units 32 to which said one antenna 321 serving as the second target antenna belongs. In this case, the second excitation signal is continuously transmitted to the position indicator 4, via the group of the first antenna units 31 and the group of the second antenna units 32 in turn. Thus, the receiving unit 34 receives a second response signal that serves as the response signal and that is transmitted from the position indicator 4 in response to the second excitation signal, via the group of the first antenna units 31 and the group of the second antenna units 32 in turn. Thereafter, the receiving unit 34 generates another detection signal based on the second response signal, and outputs the detection signal thus generated to the processing unit 36.

In step 66, the processing unit 36 updates the first and second target antennas and obtains the position information, based on the detection signal generated in step 65 and corresponding to the second response signal. In this embodiment, the position information is obtained using the following equations:

when $E2_x > E4_x$, $P_x = LU_x \times \{n_x - (E2_x - E4_x)/[(E3_x - E1_x) + (E2_x - E4_x)]\}$, when $E4_x > E2_x$, $P_x = LU_x \times \{n_x + (E4_x - E2_x)/[(E3_x - E1_x) + (E4_x - E2_x)]\}$, when $E2_x = E4_x$, $P_x = LU_x \times n_x$, when $E2_y > E4_y$, $P_y = LU_y \times \{n_y - (E2_y - E4_y)/[(E3_y - E1_y) + (E2_y - E4_y)]\}$, when $E4_y > E2_y$, $P_y = LU_y \times \{n_y + (E4_y - E2_y)/[(E3_y - E1_y) + (E4_y - E2_y)]\}$, when $E2_y = E4_y$, $P_y = LU_y \times n_y$, where the subscript x is associated with the first antenna units 31, the subscript y is associated with the second antenna units 32, P is the position information, LU is an expected resolution between any two adjacent ones of the antennas 311, 312 of the first and second antenna units 31, 32, n is a numeral numbered to the target antenna, E3 is one energy level of the second response signal, which is received by the receiving unit 34 via the target antenna, and E1, E2 and E4 are three energy levels of the second response signal, which is received by the detecting unit 34 via three antennas 311, 321 that belong to the group of the first antenna units 31 and the group of the second antenna units 32 and that have numerals n−2, n−1 and n+1, respectively.

In step 67, the switching unit 35 operates, in response to the switching control signal from the processing unit 36, to connect the target one of the first antenna units 31 or the target one of the second antenna units 32 to the transmitting and receiving units 33, 34. In this case, the transmitting unit 33 generates, in response to the transmission control signal from the processing unit 36, a third excitation signal serving as the excitation signal. The third excitation signal has a frequency that varies with time within a second set of predetermined different frequencies, which include the target frequency. The third excitation signal is transmitted to the position indicator 4 via the target one of the first antenna units 31 or the target one of the second antenna units 32 which is connected to the transmitting unit 33. Then, the receiving unit 34 receives a third response signal that serves as the response signal and that is transmitted from the position indicator 4 in response to the third excitation signal, via the target one of the first antenna units 31 or the target one of the second antenna units 32 which is connected to the receiving unit 34. Thereafter, the receiving unit 34 generates the detection signal based on the third response signal, and outputs the detection signal to the processing unit 36.

In step 68, the processing unit 36 obtains, based on the detection signal generated in step 67 and corresponding to the third response signal, state information associated with the position indicator 4. In this embodiment, the state information includes the contact pressure between the position indicator 4 and the position detecting apparatus 3, and operation state of the switch 44. In particular, step 68 includes the following sub-steps 681, 682.

In sub-step 681, the processing unit 36 obtains, based on the detection signal generated in step 67 and corresponding to the third response signal, a state value (PR). The state value (PR) can be obtained using the following equation:

$$PR=PL \times \{(Ea-Eb)/[(Ea-Eb)+(Ea-Ec)]\}+Po,$$

where PL is a predetermined resolution, Ea is a maximum energy level of the third response signal, Eb is one energy level of the third response signal associated with the third excitation signal at a corresponding frequency that is immediately less than another frequency of the third excitation signal at which the third response signal has the maximum energy level of Ea, Ec is one energy level of the third response signal associated with the third excitation signal at a corresponding frequency that is immediately greater than the another frequency of the third excitation signal, and Po is an offset.

In sub-step 682, the processing unit 36 obtains the state information based on the state value (PR).

For example, it is assumed that the oscillation frequency of the signal transmitted from the position indicator 4 is 550 KHz when the contact pressure between the position indicator 4 and the position detecting apparatus 3 is 0 while the switch 44 non-conducts, that the oscillation frequency of the same is 560 KHz when the contact pressure is maximum while the switch 44 non-conducts, that the oscillation frequency of the same is 530 KHz when the contact pressure is 0 while the switch 44 conducts, and that the oscillation frequency of the same is 540 KHz when the contact pressure is maximum while the switch 44 conducts. In view of the above assumptions, the first set of frequencies can be designed to include 520 KHz, 550 KHz and 570 KHz. Thus, the second set of frequencies can include 520 KHz, 530 KHz, 540 KHz and 550 KHz when the target frequency is 520 KHz, include 530 KHz, 540 KHz, 550 KHz and 560 KHz when the target frequency is 550 KHz, or include 540 KHz, 550 KHz, 560 KHz and 570 KHz when the target frequency is 570 KHz. The parameters Ea, Eb, Ec, PL, Po, Pr and the state information are shown in Table 1.

TABLE 1

| Frequency | Condition 1 | Condition 2 | Condition 3 | Condition 4 |
|---|---|---|---|---|
| 520 KHz | Eb | | | |
| 530 KHz | Ea | Eb | | |
| 540 KHz | Ec | Ea | Eb | |
| 550 KHz | | Ec | Ea | Eb |
| 560 KHz | | | Ec | Ea |
| 570 KHz | | | | Ec |
| | PL = 1000 | | | |
| Po | −500 | 500 | 1500 | 2500 |
| PR | 0-500 | 500-1000 | 2000-2500 | 2500-3000 |
| State information | Operation state of switch 44 | conduction | | non-conduction | |
| Contact pressure | 0-1000 | | 0-1000 | |

In view of the above, the position detecting system of this embodiment has the following advantages:

1. The position detecting apparatus 3 can transmit the excitation signal with a variable frequency. As a result, even if the position indicator 4 transmits the signal whose oscillation frequency changes with operation state of the position indicator 4, the position detecting apparatus 3 can still obtain the target frequency of the excitation signal, and then perform scanning operations using the target frequency. Therefore, the position detecting apparatus 3 can provide the position information and the contact pressure with relatively high precision. In addition, the position detecting apparatus 3 can provide the operation state of the switch 44 with relatively high accuracy.

2. In the case that each of the first and second antenna units 31, 32 includes at least two antennas 311, 312, a number of the switches 351 of the switching unit 35 is less than a total number of the antennas 311, 312. Therefore, the position detecting apparatus 3 requires a smaller number of the switches 351 as compared to the prior art. On the other hand, even if the total number of the antennas 311, 312 increases as required, configuration of the transmitting unit 33, the receiving unit 34, the switching unit 35 and the processing unit 36 can remain unchanged.

Figure 1:
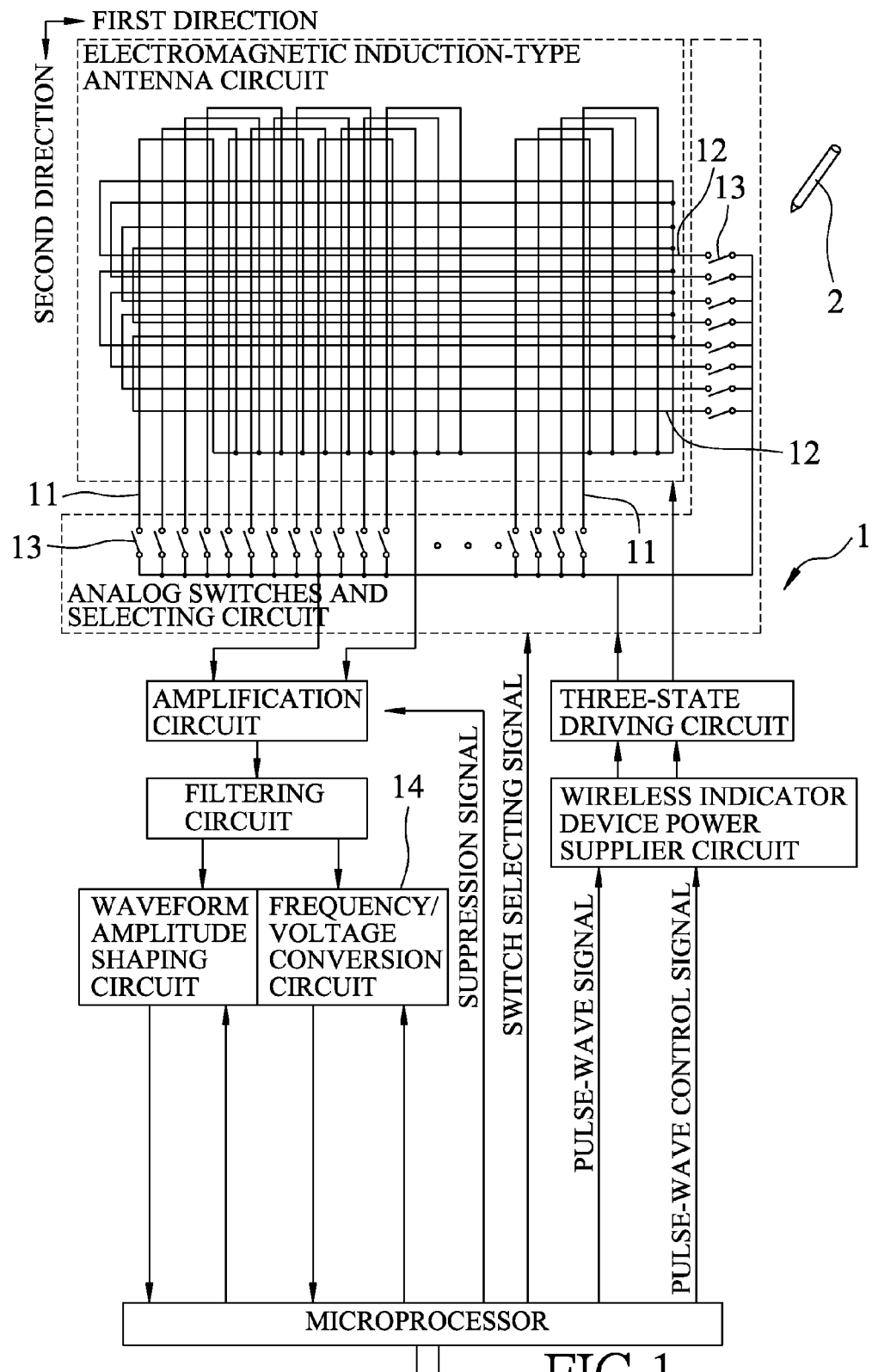
FIG. 1 is a schematic circuit diagram illustrating a digital tablet and a wireless pointing device of a conventional digital tablet pointing system.
Figure 2:
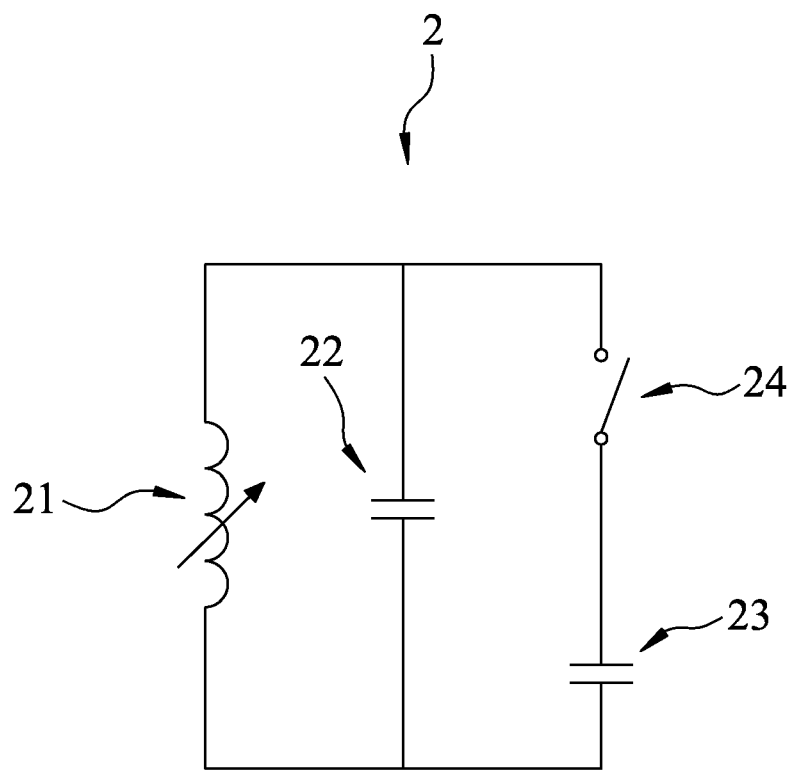
FIG. 2 is a schematic circuit diagram illustrating the wireless pointing device of the conventional digital tablet pointing system.

Moreover, the position detecting apparatus 3 can provide the state information based on the energy level of the response signal without the frequency/voltage conversion circuit 14 required by the digital tablet 1 of the aforesaid conventional passive-type digital tablet pointing system (FIG. 1).

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A position detecting method for detecting, using a position detecting apparatus, a position indicated by a position indicator, the position detecting apparatus including a plurality of antenna units, each of which includes at least one antenna, the antennas of the antenna units being arranged in a direction, and being numbered consecutively in the direction, the position indicator being operable to obtain energy from an external signal upon receipt of the external signal and then to transmit a signal in response to the external signal using the energy obtained thereby, said position detecting method comprising the steps of:

(A) by the position detecting apparatus, transmitting to the position indicator a first excitation signal having a variable frequency, and then, receiving a first response signal transmitted from the position indicator in response to the first excitation signal, via a target one of the antenna units which includes an antenna serving as a target antenna;

(B) determining based on the first response signal, by the position detecting apparatus, a target frequency of the first excitation signal at which the first response signal has a maximum energy level;

(C) by the position detecting apparatus, continuously transmitting to the position indicator a second excitation signal having the target frequency, and then, receiving a second response signal, which is transmitted from the position indicator in response to the second excitation signal, via a group of the antenna units individually and successively, the group of the antenna units including the target one of the antenna units; and (D) obtaining based on the second response signal, by the position detecting apparatus, position information corresponding to the position that is indicated by the position indicator and that is relative to the position detecting apparatus;

wherein in step (D), the position information is obtained using the following equations:

when $E2>E4$, $P=LU\times\{n-(E2-E4)/[(E3-E1)+(E2-E4)]\}$, when $E4>E2$, $P=LU\times\{n+(E4-E2)/[(E3-E1)+(E4-E2)]\}$, when $E2=E4$, $P=LU\times n$, where P is the position information, LU is an expected resolution between any two adjacent ones of the antennas of the antenna units, n is a numeral numbered to the target antenna, E3 is an energy level of a component of the second response signal, which is received via the target antenna, and E1, E2 and E4 are energy levels of components of the second response signals, which are received via respective antennas in the group of the antenna units whose numerals are n−2, n−1 and n+1, respectively.

2. A position detecting method for detecting, using a position detecting apparatus, a position indicated by a position indicator, the position detecting apparatus including a plurality of antenna units, each of which includes at least one antenna, the antennas of the antenna units being arranged in a direction, the position indicator being operable to obtain energy from an external signal upon receipt of the external signal and then to transmit a signal in response to the external signal using the energy obtained thereby, said position detecting method comprising the steps of:

(A) by the position detecting apparatus, transmitting to the position indicator a first excitation signal having a variable frequency, and then, receiving a first response signal transmitted from the position indicator in response to the first excitation signal, via a target one of the antenna units which includes an antenna serving as a target antenna;

(B) determining based on the first response signal, by the position detecting apparatus, a target frequency of the first excitation signal at which the first response signal has a maximum energy level;

(C) by the position detecting apparatus, continuously transmitting to the position indicator a second excitation signal having the target frequency, and then, receiving a second response signal, which is transmitted from the position indicator in response to the second excitation signal, via a group of the antenna units individually and successively, the group of the antenna units including the target one of the antenna units;

(D) obtaining based on the second response signal, by the position detecting apparatus, position information corresponding to the position that is indicated by the position indicator and that is relative to the position detecting apparatus;

(E) by the position detecting apparatus, transmitting to the position indicator a third excitation signal having a variable frequency, which contains the target frequency, and then, receiving a third response signal transmitted from the position indicator in response to the third excitation signal, via the target one of the antenna units; and (F) obtaining based on the third response signal, by the position detecting apparatus, state information associated with the position indicator;

wherein step (F) includes the sub-steps of:

(F1) obtaining based on the third response signal, by the position detecting apparatus, a state value using the following equation:

$PR=PL\times\{(Ea-Eb)/[(Ea-Eb)+(Ea-Ec)]\}+Po$, where PR is the state value, PL is a predetermined resolution, Ea is a maximum energy level of the third response signal, Eb is one energy level of the third response signal associated with the third excitation signal at a corresponding frequency that is immediately less than another frequency of the third excitation signal at which the third response signal has the maximum energy level of Ea, Ec is one energy level of the third response signal associated with the third excitation signal at a corresponding frequency of the third excitation signal that is immediately greater than the another frequency of the third excitation signal, and Po is an offset; and (F2) obtaining, by the position detecting apparatus, the state information based on the state value.

3. The position detecting method of claim 1, prior to step (A), further comprising the steps of:

(i) generating, by the position detecting apparatus, a test excitation signal that has a frequency selected from a plurality of predetermined different frequencies;

(ii) by the position detecting apparatus, continuously transmitting to the position indicator the test excitation signal, and then, receiving a test response signal, which is transmitted from the position indicator in response to the test excitation signal, via the antenna units individually and successively;

(iii) determining, by the position detecting apparatus, whether a maximum energy level of the test response signal is greater than a predetermined energy threshold level;

(iv) when the maximum energy level of the test response signal is greater than the predetermined energy threshold level, selecting, by the position detecting apparatus, one of the antennas of the antenna units as the target antenna that is closest to the position indicator; and (v) when the maximum energy level of the test response signal is not greater than the predetermined energy threshold level, changing, by the position detecting apparatus, the frequency of the test excitation signal to one of unselected ones of the predetermined different frequencies, and repeating steps (ii) to (v) until the target antenna is selected.

4. The position detecting method of claim 2, prior to step (A), further comprising the steps of:

(i) generating, by the position detecting apparatus, a test excitation signal that has a frequency selected from a plurality of predetermined different frequencies;

(ii) by the position detecting apparatus, continuously transmitting to the position indicator the test excitation signal, and then, receiving a test response signal, which is transmitted from the position indicator in response to the test excitation signal, via the antenna units individually and successively;

(iii) determining, by the position detecting apparatus, whether a maximum energy level of the test response signal is greater than a predetermined energy threshold level;

(iv) when the maximum energy level of the test response signal is greater than the predetermined energy threshold level, selecting, by the position detecting apparatus, one of the antennas of the antenna units as the target antenna that is closest to the position indicator; and (v) when the maximum energy level of the test response signal is not greater than the predetermined energy threshold level, changing, by the position detecting apparatus, the frequency of the test excitation signal to one of unselected ones of the predetermined different frequencies, and repeating steps (ii) to (v) until the target antenna is selected.

\* \* \* \* \*